(12) United States Patent
Heck

(10) Patent No.: US 8,681,596 B2
(45) Date of Patent: *Mar. 25, 2014

(54) SEEK-SCAN PROBE (SSP) MEMORY WITH SHARP PROBE TIPS FORMED AT CMOS-COMPATIBLE TEMPERATURES

(75) Inventor: John Heck, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,848

(22) Filed: Dec. 7, 2010

(65) Prior Publication Data

US 2011/0078835 A1 Mar. 31, 2011

Related U.S. Application Data

(63) Continuation of application No. 11/725,647, filed on Mar. 19, 2007, now Pat. No. 7,869,334.

(51) Int. Cl.
*G11B 9/00* (2006.01)
*H01L 21/331* (2006.01)
*H01L 31/036* (2006.01)

(52) U.S. Cl.
USPC ............................ 369/126; 438/618; 257/773

(58) Field of Classification Search
USPC .......... 369/126; 438/197, 563, 660, 661, 618, 438/597, 662; 365/163, 63, 171, 36; 216/11; 324/537, 755.05; 428/641, 428/429, 446, 448; 257/773; 205/118
See application file for complete search history.

(56) References Cited

U.S. PATENT DOCUMENTS

| | | | |
|---|---|---|---|
| 5,393,647 A | 2/1995 | Neukermans et al. | |
| 5,643,032 A | 7/1997 | Cheng et al. | |
| 6,198,300 B1 | 3/2001 | Doezema et al. | |
| 6,400,166 B2* | 6/2002 | Babson et al. | 324/755.05 |
| 6,417,673 B1* | 7/2002 | Kleiman et al. | 324/537 |
| 7,050,320 B1* | 5/2006 | Lai et al. | 365/63 |
| 7,074,340 B2* | 7/2006 | Lugstein et al. | 216/11 |

(Continued)

OTHER PUBLICATIONS

J. H. Lee, et al., "Polycrystalline silicon field emitter arrays by silicidation-sharpening technique at low temperature," *Journal of Vacuum Science & Technology B*, Mar./Apr. 1998, vol. 16, No. 2, pp. 773-776.

(Continued)

*Primary Examiner* — Kevin M. Bernatz
*Assistant Examiner* — Louis Falasco

(57) ABSTRACT

Embodiments of a process comprising forming one or more micro-electro-mechanical (MEMS) probe on a conductive metal oxide semiconductor (CMOS) wafer, wherein each MEMS probe comprises a cantilever beam with a fixed end and a free end and wherein the CMOS wafer has circuitry thereon; forming an unsharpened tip at or near the free end of each cantilever beam; depositing a silicide-forming material over the tip; annealing the wafer to sharpen the tip; and exposing the sharpened tip. Embodiments of an apparatus comprising a conductive metal oxide semiconductor (CMOS) wafer including circuitry therein; one or more micro-electro-mechanical (MEMS) probes integrally formed on the CMOS wafer, wherein each MEMS probe comprises a cantilever beam with a fixed end and a free end and a sharpened tip at or near the free end, the sharpened tip formed by a process comprising forming an unsharpened tip at or near the free end of each cantilever beam, depositing a silicide-forming material over the unsharpened tip, annealing the wafer to sharpen the unsharpened tip, and exposing the sharpened tip.

12 Claims, 4 Drawing Sheets

(56) References Cited

U.S. PATENT DOCUMENTS

| | | | |
|---|---|---|---|
| 7,142,449 B2* | 11/2006 | Smith et al. | 365/171 |
| 7,239,544 B2* | 7/2007 | Chen et al. | 365/163 |
| 7,494,593 B1 | 2/2009 | Chen et al. | |
| 7,869,334 B2* | 1/2011 | Heck | 369/126 |
| 2001/0019461 A1* | 9/2001 | Allenspach et al. | 360/59 |
| 2001/0021575 A1* | 9/2001 | Furukawa et al. | 438/563 |
| 2005/0130360 A1* | 6/2005 | Zhan et al. | 438/197 |
| 2005/0259366 A1* | 11/2005 | Champion et al. | 360/324.2 |
| 2006/0056235 A1* | 3/2006 | Chen et al. | 365/163 |
| 2006/0079086 A1* | 4/2006 | Boit et al. | 438/662 |
| 2006/0125107 A1* | 6/2006 | Kirby et al. | 257/773 |
| 2006/0249391 A1* | 11/2006 | Jin | 205/118 |
| 2006/0291364 A1* | 12/2006 | Kozicki | 369/126 |
| 2007/0041238 A1* | 2/2007 | Belov | 365/151 |
| 2008/0229577 A1 | 9/2008 | Heck | |

OTHER PUBLICATIONS

A. E. Franke, et al., "Polycrystalline Silicon-Germanium Films for Integrated Microsystems," *Journal of Microelectromechanical Systems*, Apr. 2003, vol. 12, No. 2, pp. 160-171.

M. Despont, et al., "Wafer-Scale Microdevice Transfer/Interconnect: Its Application in an AFM-Based Data-Storage System," *Journal of Microelectromechanical Systems*, Dec. 2004, vol. 13, No. 6, pp. 895-901.

J. Tregilgas, "How We Developed an Amorphous Hinge Material," *Advanced Materials & Processes*, Jan. 2005, pp. 46-49.

U.S. Office Action mailed Nov. 27, 2009, U.S. Appl. No. 11/725,647, filed Mar. 19, 2007 (7 pages).

U.S. Office Action mailed Apr. 6, 2010, U.S. Appl. No. 11/725,647, filed Mar. 19, 2007 (7 pages).

U.S. Notice of Allowance mailed Sep. 8, 2010, U.S. Appl. No. 11/725,647, filed Mar. 19, 2007 (9 pages).

\* cited by examiner

SEEK-SCAN PROBE (SSP) MEMORY WITH SHARP PROBE TIPS FORMED AT CMOS-COMPATIBLE TEMPERATURES

CROSS-REFERENCE TO RELATED APPLICATIONS

This application is a continuation of U.S. patent application Ser. No. 11/725,647, filed 19 Mar. 2007, and claims priority therefrom under 35 U.S.C. §120. The priority application is currently pending.

TECHNICAL FIELD

The present invention relates generally to micro-electromechanical (MEMS) systems and in particular, but not exclusively, to MEMS seek-scan probe (SSP) memories with sharp probe tips formed at low temperatures.

BACKGROUND

Seek-scan probe (SSP) memory is a type of memory that uses a non-volatile storage media as the data storage mechanism and offers significant advantages in both cost and performance over conventional charge storage memories. Typical SSP memories include storage media made of materials that can be electrically switched between two or more states having different electrical characteristics, such as resistance or polarization dipole direction.

SSP memories are written to by passing an electric current through the storage media or applying an electric field to the storage media. Passing a current through the storage media is typically accomplished by passing a current between a sharp probe tip on one side of the storage media and an electrode on the other side of the storage media. Current SSP memories use probe tips positioned on the free end of one or more MEMS probes. In an idle state each MEMS probe maintains the probe tip at a certain distance from the storage media, but before the electric field or current can be applied to the storage media the probe tip must usually be brought close to, or in some cases in direct contact with, the storage media. To maximize the number of data bits that can be written to the storage media (i.e., the storage density), it is advantageous for the probe tip to be as sharp as possible so that the data bits written in the storage media will be as small as possible.

In some SSP memories, to obtain a sufficient signal-to-noise ratio for read/write/erase operations on the storage media, it is advantageous to have electrical circuitry such as amplifiers, signal processors, etc, close to, adjacent to, or under the MEMS probe. One way of achieving this proximity is to place the MEMS probes on a conductive metal oxide semiconductor (CMOS) wafer in or on which the needed circuitry has already been formed. Unfortunately, placing sharp-tipped MEMS probes on a CMOS wafer has been exceedingly difficult because the high-temperature process required to make sharp-tipped probes are incompatible with the post-processing requirements of CMOS wafers; in essence, the high-temperature processes alter or destroy circuitry or other elements formed on the CMOS wafer.

One solution to putting sharp-tipped MEMS probes on a CMOS wafer has been to fabricate the MEMS probes separately and then transfer them and mount them on the surface of a CMOS wafer. This, however, is a difficult and time-consuming task that results in high costs and low yields.

BRIEF DESCRIPTION OF THE DRAWINGS

Non-limiting and non-exhaustive embodiments of the present invention are described with reference to the following figures, which are not drawn to scale unless otherwise specified and in which like reference numerals refer to like parts throughout the various views unless otherwise specified.

DETAILED DESCRIPTION OF THE ILLUSTRATED EMBODIMENTS

Embodiments of an apparatus, system and process for a seek-scan probe (SSP) memory including MEMS probes with sharpened tips formed on a CMOS wafer are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
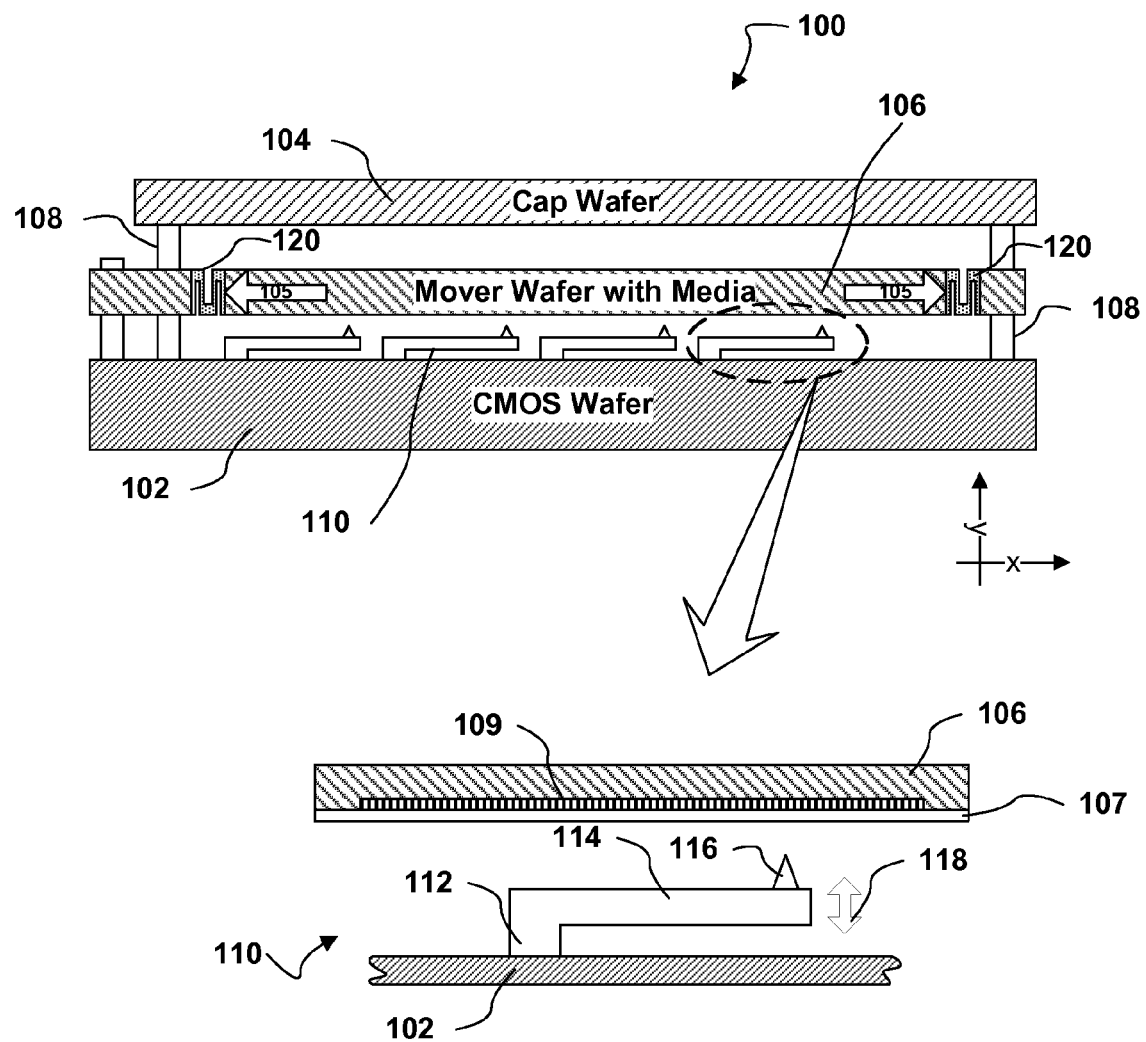
FIG. 1 is a side elevation of an embodiment of a seek-scan probe (SSP) memory.

FIG. 1 illustrates an embodiment of a seek-scan probe (SSP) memory 100. SSP memory 100 includes a conductive metal oxide semiconductor (CMOS) wafer 102 over which a cap wafer 104 is positioned and supported by supports 108. Together, supports 108 and cap wafer 104 form a sealed enclosure within which a mover wafer 106 is suspended, also from supports 108, such that it is substantially parallel to the surface of CMOS wafer 102. As illustrated by arrows 105, mover wafer 106 is capable of motion relative to CMOS wafer 102 in a plane substantially parallel to the surface of the CMOS wafer (i.e., the x-z plane). One or more MEMS probes 110 are formed on a surface of CMOS wafer 102 so that the sharpened tip 116 of each MEMS probe 110 can come close to, or make contact with, the lower surface of mover wafer 106 when MEMS probes 110 are deflected upward, as illustrated by arrows 118.

In addition to supporting the other components of SSP memory 100, CMOS wafer 102 can include therein circuitry that controls the operation of memory 100. Examples of circuitry that can be contained on CMOS wafer 102 include activation electrodes (not shown) that cause MEMS probes 110 to deflect upward toward mover wafer 106; circuitry to send signals to sharpened tip 116 so that it can write data into storage media 107 on mover wafer 106; sensing and amplifying circuitry to receive, condition and amplify signals received from sharpened tip 116 when it reads data from storage media 107; memory to buffer and/or store data read from or written to, storage media 107; logic circuitry and/or software to encode and/or decode data that is written to or read from the storage media on mover wafer 106; and so forth.

As noted above, cap wafer 104 is supported over CMOS wafer 102 by supports 108. Together with supports 108, cap wafer 104 forms an enclosure within which mover wafer 106, cantilever probes 110, and other components of SSP memory 100 are housed. In one embodiment, the enclosure formed by cap wafer 104, supports 108 and CMOS wafer 102 is a hermetic enclosure that protects the components within the enclosure from moisture, dust and other environmental contaminants, although in other embodiments the enclosure need not be hermetic. In one embodiment, cap wafer 104 can be made of a material such as silicon or polysilicon, although in other embodiments it can be some other kind of material such as ceramic, glass or plastic. Supports 108 can form a seal ring around the device, and can be made of a metal solder or eutectic or other material suitable for bonding wafers 102, 104, and 106.

Mover wafer 106 carries the storage media 107 on which SSP memory 100 writes data and from which it reads data. Mover wafer 106 can also include other elements such as electrodes 109 between storage media 107 and wafer 106 that facilitate reading and writing of data on storage media 107. Mover wafer 106 is supported between cap wafer 104 and CMOS wafer 102 by a suspension 120 coupled to supports 108. Suspension 120 provides electrical connections to the mover wafer and allows the mover wafer to move substantially parallel to the CMOS wafer (i.e., substantially in the x-z plane), enabling memory 100 to change the x-z position at which the sharpened tips 116 of MEMS probes 110 read and write data to and from storage media 107. To enable mover wafer 106 to move in the x-z plane, SSP memory 100 also includes a drive mechanism (not shown) coupled to the mover wafer. In one embodiment, the drive mechanism is an electrostatic comb drive, although in other embodiments the drive mechanism can be of a different type; examples of drive mechanisms that can be used include electromagnetic comb drives, electromagnetic coils, parallel-plate drives, vernier drives and the like. In one embodiment, mover wafer 106 is composed of silicon, polysilicon, single-crystal silicon, silicon germanium ($Si_xGe_y$) or some other variant of silicon and has a layer of storage media 107 deposited thereon on the surface of the wafer that faces MEMS probes 110. In one embodiment, storage media 107 is a chalcogenide material, although in other embodiments it can be a different type of material such as a ferroelectric or polymer material.

MEMS probes 110 are integrally formed on a surface of CMOS wafer 102. Although the illustrated embodiment shows the MEMS probes as cantilever-type probes, other embodiments can use other types of probes, such as see-saw-type probes; still other embodiments can include combinations of different types of probes. Each cantilever MEMS probe 110 includes a support or pedestal 112 formed on the surface of CMOS wafer 102 and a beam 114 that includes a fixed end attached to pedestal 112 and a free end opposite the fixed end. In the embodiment shown the beam 114 and pedestal 112 are integrally formed of the same material, but in other embodiments beam 114 and pedestal 112 need not be formed integrally and need not be formed of the same material. Examples of materials that can be used for pedestal 112 and/or beam 114 include polysilicon, single-crystal silicon, silicon germanium ($Si_xGe_y$), other materials not listed here, or combinations of materials.

Each MEMS probe 110 includes a sharpened tip 116 at or near the free end of beam 114. To maximize the amount of data that can be written to and read from storage media 107, each sharpened tip 116 should be as sharp as possible so that each data bit written to the storage media will be as small as possible. Each sharpened tip 116 is formed of an electrically conductive material such that when the free end of beam 114 is deflected toward storage media 107 a current can be passed through sharpened tip 116 to either write data bits into the storage media or read data bits already written into the storage media. Each sharpened tip 116 is electrically coupled via beam 114 and pedestal 112, or via electrical traces in beam 114 and pedestal 112, to circuitry within CMOS wafer 102 that can read, write, amplify, decode, and perform other operations on data written to or read from storage media 107 by sharpened tip 116. The illustrated embodiment shows sharpened tip 116 with a substantially conical shape, although in other embodiments other tip shapes can be used. Similarly, in one embodiment each sharpened tip 116 is formed of amorphous silicon, although in other embodiments other types of materials can be used.

Figure 2A:
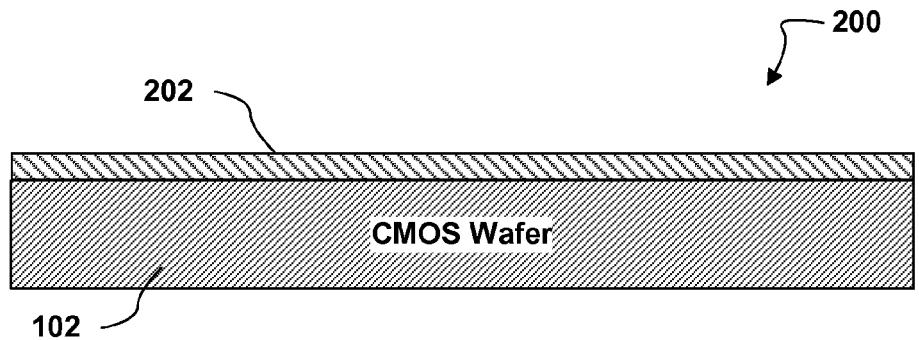
FIGS. 2A-2H are side elevations illustrating an embodiment of a process for forming one or more micro-electromechanical (MEMS) probes with sharp tips on a conductive metal oxide semiconductor (CMOS) wafer.

FIGS. 2A-2H illustrate an embodiment of a process by which MEMS probes 110 with sharpened tips 116 can be integrally formed on CMOS wafer 102. FIG. 2A illustrates the initial part of the process, in which a sacrificial layer 202 is deposited on the surface of CMOS wafer 102. CMOS wafer 102 has the necessary circuitry formed in or on it before sacrificial layer 102 is deposited on its surface. In one embodiment, sacrificial layer 103 is made of polysilicon, but in other embodiments other materials or combinations of materials can be used for sacrificial layer 202.

Figure 2B:
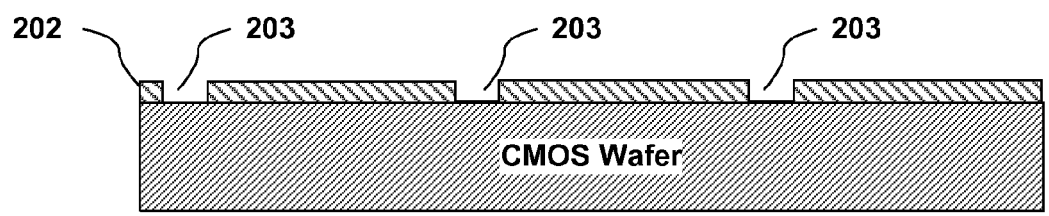

FIG. 2B illustrates the next part of the process embodiment. Starting with the wafer as shown in FIG. 2A, sacrificial layer 202 is patterned and etched to form holes 203. Holes 203 extend throughout the thickness of the sacrificial layer so that when the holes are filled in with material deposited on the sacrificial layer, the material will become the pedestals 112 of the MEMS probes and will be anchored to CMOS wafer 102 (see FIG. 2D). In one embodiment, sacrificial layer 202 can be patterned and etched using standard photolithographic techniques, although in other embodiments other techniques can be used to form the holes.

Figure 2C:
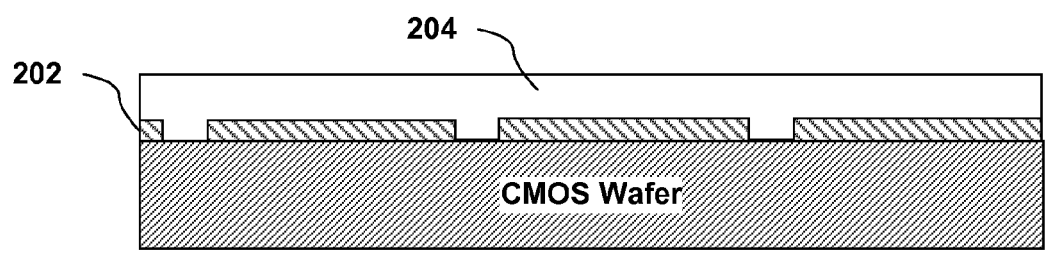

FIG. 2C illustrates the next part of the process embodiment. Starting with the wafer as shown in FIG. 2B, a layer of material 204 is deposited on sacrificial layer 202 such that it fills in holes 203 and covers the sacrificial layer. In one embodiment, layer 204 includes silicon germanium ($Si_xGe_y$), although in other embodiments layer 204 can include polysilicon, single-crystal silicon, silicon germanium ($Si_xGe_y$), amorphous silicon, sputtered or electroplated metals, combinations of these, or other materials or combinations of materials not listed here.

Figure 2D:
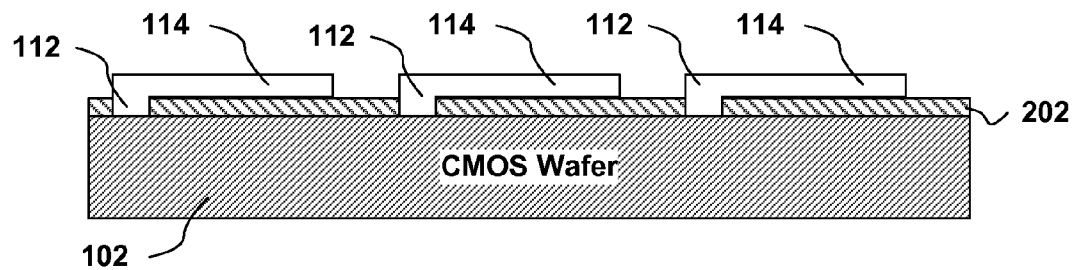

FIG. 2D illustrates the next part of the process embodiment. Starting with the wafer as shown in FIG. 2C, layer 204 is patterned and etched to form MEMS probes 110. In one embodiment, MEMS probes 110 can be patterned and etched using standard photolithographic techniques, but in other embodiments other techniques can be used. In the embodiment shown, each MEMS probe 110 is a cantilever beam that includes a pedestal 112 formed in holes 203 of sacrificial layer 202 and a beam 114 that is integrally formed with the pedestal 112; in other embodiments, beam 114 and pedestal 112 need not be formed integrally and need not be formed of the same material.

Figure 2E:
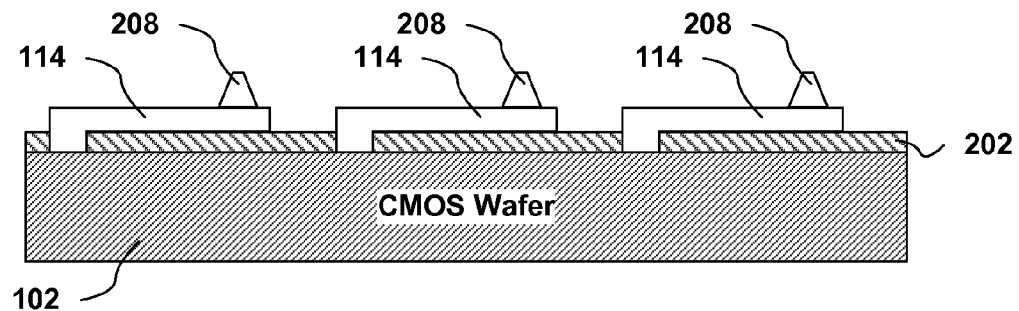

FIG. 2E illustrates the next part of the process embodiment. Starting with the wafer as shown in FIG. 2D, a material from which sharpened tips 116 will be made is deposited on the wafer and is then patterned and etched to form unsharpened tips 208 at or near the free end of each beam 114. In one embodiment, unsharpened tips 108 can be patterned and etched using standard photolithographic techniques, but in other embodiments other techniques can be used. Each unsharpened tip 208 has a substantially conical or frustum shape and is formed of amorphous silicon, although in other embodiments unsharpened tips 208 can have different shapes and can be formed of a different material or combinations of materials.

Figure 2F:
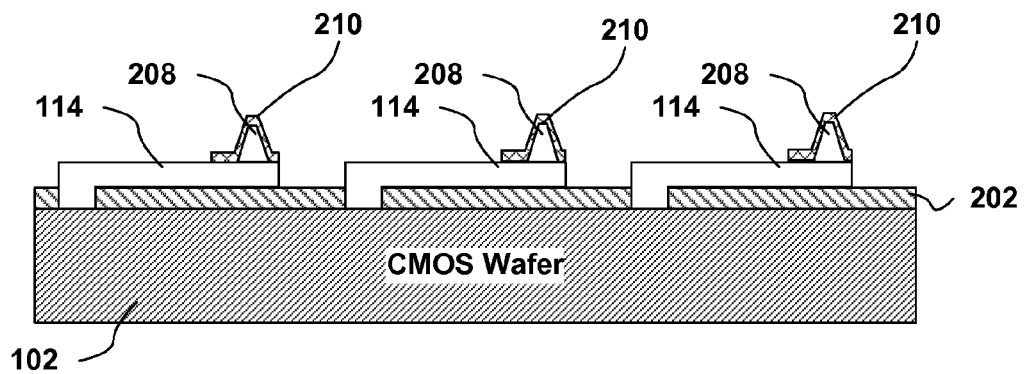

FIG. 2F illustrates the next part of the process embodiment. Starting with the wafer as shown in FIG. 2E, a silicide-forming material 210 is deposited, patterned and etched using standard techniques such that it covers unsharpened tips 208. In one embodiment, silicide-forming material 210 is titanium (Ti), but in other embodiments silicide-forming material 201 can be cobalt (Co), nickel (Ni), or some other silicide-forming material not listed here. In still other embodiments, the silicide-forming material can be a combination or alloy of other silicide-forming materials.

Figure 2G:
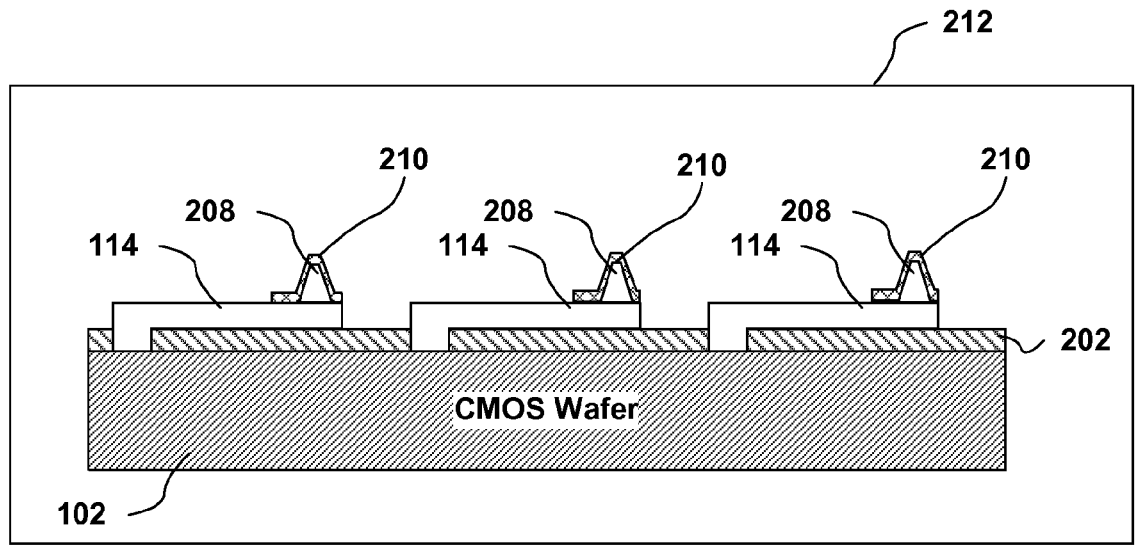

FIG. 2G illustrates the next part of the process embodiment. Starting with the wafer as shown in FIG. 2F, the entire wafer is annealed by inserting it into an oven 212 and heating. The wafer is heated to a temperature that will cause a silicide to form at the interface between unsharpened tip 208 and silicide-forming material 210. The exact silicide formed will depend on the materials used for unsharpened tips 208 and silicide-forming material 210. If amorphous silicon is used for unsharpened tips 208 and titanium is used for silicide-forming material 210, the silicide can be TiSi or $TiSi_2$; if amorphous silicon is used with cobalt as the silicide-forming material, the silicide can be CoSi or $CoSi_2$; and so forth. The required annealing temperature will vary depending on the materials used for unsharpened tip 208 and silicide-forming material 210, but should be high enough to induce silicide formation yet low enough to be compatible with CMOS post-processing requirements (i.e., low enough that it will not distort or destroy elements formed on the CMOS wafer). In one embodiment, the annealing temperature can be in the range of 450-550° C. if titanium is used as the silicide-forming metal, but in other embodiments it can be as low as 350° C. if cobalt or nickel is used as the silicide-forming metal. The wafer is left in oven 212 at the desired temperature until enough silicide is formed at the interface between unsharpened tip 208 and silicide-forming material 210 that the remaining tip material (i.e., the tip material that did not interact with silicide-forming material 210 to form a silicide) forms sharpened tip 116; as with the temperature, the required amount of time will vary depending on the materials used for unsharpened tip 208 and silicide-forming material 210. The amount of time required can be between 1-60 minutes, for example.

Figure 2H:
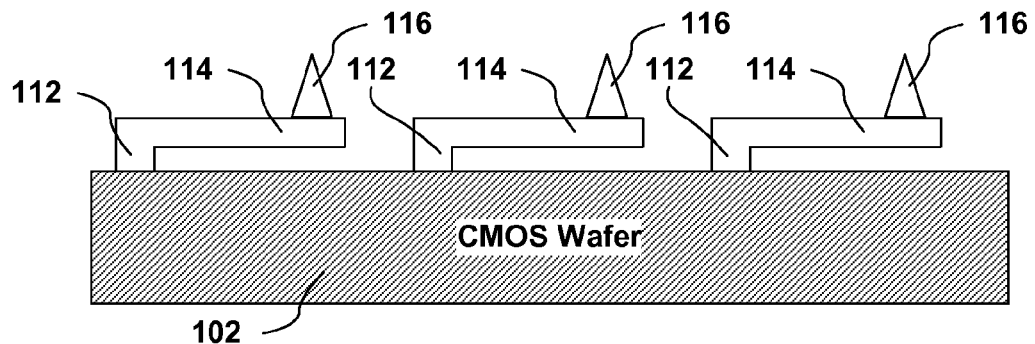

FIG. 2H illustrates the final part of the process embodiment. Starting with the wafer as shown in FIG. 2G, sharpened tips 116 are exposed by removing any remaining silicide-forming material 210 and also removing the silicide that formed during annealing at the interface of silicide-forming material 210 and the unsharpened tip 208. In one embodiment, both silicide-forming material 210 and the silicide are removed using a hydrofluoric acid (HF) etch, although in other embodiment other types of etching and other etchants can be used for removal, such as a combination of ammonium, hydrogen peroxide, and water (AMP). Removal of the silicide from unsharpened tip 108 results in a highly sharpened tip 116 on the MEMS probe.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a semiconductor wafer including circuitry therein;
one or more scanning probes integrally formed on the semiconductor wafer, wherein each of the one or more scanning probes comprises a cantilever beam with a fixed end and a free end and a sharpened tip at or near the free end, wherein each of the one or more scanning probes is operably coupled to circuitry within the semiconductor wafer, and wherein the circuitry includes sensing and amplification circuitry to receive and amplify signals from the sharpened tip, the sharpened tip formed on the cantilever beam that is operably coupled to the circuitry within the semiconductor wafer by a process comprising:
forming an unsharpened tip at or near the free end of each cantilever beam, wherein the unsharpened tip is formed of amorphous silicon,
depositing a silicide-forming material over the unsharpened tip,
annealing the unsharpened tip, wherein silicide is formed from at least a portion of the silicide-forming material during the annealing to sharpen the tip, and
removing the formed silicide from the sharpened tip.

2. The apparatus of claim 1, further comprising etching away the formed silicide.

3. The apparatus of claim 1, wherein the etching is performed by an acid material.

4. The apparatus of claim 1, wherein the unsharpened tip is a substantially conical shape or a substantially frustum shape.

5. The apparatus of claim 1, wherein removing comprises etching.

6. The apparatus of claim 5, wherein etching comprises a hydrofluoric acid etch.

7. The apparatus of claim 1, wherein removing further comprises removing any remaining silicide forming material that remains after the wafer is annealed.

8. The apparatus of claim 1, wherein depositing comprises depositing, patterning, and etching so that the silicide forming material covers the unsharpened tip.

9. The apparatus of claim 1, wherein annealing comprises heating to a temperature high enough for silicide formation but lower than a temperature to damage the semiconductor wafer.

10. The apparatus of claim 1, wherein the circuitry additionally includes activation electrodes capable of causing a scanning probe to deflect.

11. The apparatus of claim 1, wherein the circuitry additionally includes memory to store data read from or written to a storage media operably coupled to the sharpened tip.

12. The apparatus of claim 1, wherein the silicide material is comprised of cobalt or nickel.

* * * * *